Patented Mar. 31, 1942

2,277,861

UNITED STATES PATENT OFFICE 2,277,861

PROCESS FOR THE PREPARATION OF DIAMIDINE DERIVATIVES

Arthur James Ewins and Harry James Barber, Romford, George Newbery, Hutton Mount, Julius Nicholson Ashley, Upminster, and Alan David Henderson Self, Hornchurch, England, assignors to May & Baker, Limited, London, England, a company of Great Britain and Northern Ireland No Drawing. Application December 5, 1938, Serial No. 244,032. In Great Britain December 10, 1937

6 Claims. (Cl. 260—564)

The present invention relates to the preparation of amidine derivatives having trypanocidal properties.

It is known that certain substituted derivatives of di- and tri-phenyl methane possess bactericidal properties. It is also known that the replacement of the amino group in a series of diaminoalkanes by amidine groups enhances the therapeutic properties of these compounds. We have found that many amidine substituted derivatives of diaryl alkanes of the type

AmR—(CH$_2$)$_n$—RAm in which Am represents the amidine residue

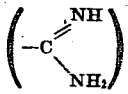

R a phenyl residue, and $n$ a whole number not exceeding twelve, possess trypanocidal and other therapeutically valuable properties. It has also been found that the replacement of one or more CH$_2$ groups in the alkane chain by a divalent element such as oxygen or sulphur, or a divalent group such as NH, in many cases enhances these properties while amidine derivatives of the directly linked phenyl residue (in which case $n=0$) are also therapeutically active.

The object of the present invention, therefore, is the manufacture of diamidine derivatives of the general type Am·R·X·R·Am in which Am represents the amidine group

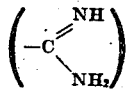

R represents a benzene residue, and X represents a linkage which may be a single bond or an alkane chain —(CH$_2$)$_n$— where $n$ represents 1 to 12 and in which also one or more of the CH$_2$ groups may be replaced by oxygen, or sulphur or the group NH.

According to the present invention such compounds are prepared from the corresponding dicyano compounds by treating them in solution in an anhydrous alcohol with dry hydrochloric or hydrobromic acid whereby the cyano groups are converted into imino ether hydrochlorides or hydrobromides

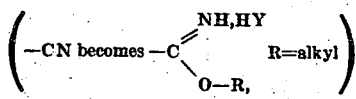

which on treatment with ammonia yields the required amidine.

The following examples illustrate how the invention is carried out in practice, but the invention is in no way limited to the examples.

Example 1

10 grams of 4:4' dicyano-diphenyl-methane are suspended in 10.5 cc. of alcohol and the mixture saturated with dry hydrogen chloride at 0° C.; after standing in the cold for some hours the reaction mixture is freed as far as possible from hydrochloric acid by means of a vacuum. The residual crystalline mass is then treated with 100 cc. of alcoholic ammonia (10%) in a closed vessel for 3 hours at 30–40° C. On concentration of the solution, ammonium chloride separates and is removed by filtration. The final syrupy residue is treated with acetone, when crystals of 4:4' diamidino-diphenyl-methane dihydrochloride (Cl found 25.2; theory 24.6) are obtained.

Example 2

10 grams of 4:4' dicyano-diphenyl are suspended in 70 cc. of absolute alcohol and the suspension saturated with dry hydrogen chloride at 0° C. The mixture is kept for 24 hours at 0–10° C. and then the excess hydrogen chloride and much of the alcohol are removed under reduced pressure, at ordinary temperature. The residue consisting of the imino-ether hydrochloride and some unchanged dinitrile is treated with 150 cc. of 10% absolute alcoholic ammonia and the mixture heated in a closed vessel for 1 hour at 60° C. to complete the conversion to the di-amidine.

After cooling, the excess of ammonia and alcohol are distilled off at ordinary pressure on a steam bath. The residue is treated with water and the solution filtered from any unchanged nitrile; 4:4'-diamidino diphenyl is precipitated from the solution by careful addition of sodium hydroxide solution with good cooling. The product is a white crystalline powder, melting point 254–5° C. (with decomposition).

Example 3

10 grams of 4:4' dicyano-diphenyl sulphide (prepared from 4:4' diamino diphenyl sulphide) are suspended in 70 cc. of absolute alcohol and the suspension saturated with dry hydrogen chloride at 0° C. The whole is left stoppered for 24 hours at 0–10° C. and at the end of that period, the excess of hydrogen chloride and much of the alcohol are removed under reduced pressure at ordinary temperature. The residual mass of imino-ether hydrochloride and some unchanged dinitrile is treated with 150 cc. of 10% alcoholic ammonia and the mixture transferred to a pressure bottle in which it is treated for 1 hour at 60° C. to complete the conversion to amidine.

After cooling, the contents of the pressure bottle are removed and the excess ammonia and alcohol are distilled off at ordinary pressure on a steam bath. The residue is treated with water and the solution filtered from any unchanged nitrile. 4:4' diamidino-diphenyl-sulphide is precipitated from the solution by addition of dilute sodium hydroxide solution. It crystallises in plates, melting point 209–10° C.

*Example 4*

10 grams of 4:4' dicyan-dyphenyloxide prepared from the corresponding 4:4' diamino-diphenyloxide are suspended in 70 cc. of absolute alcohol saturated with dry hydrogen chloride at 0° C. The mixture is kept at 0°–10° C. for 24 hours, the excess hydrogen chloride and alcohol removed by distillation in vacuo and the residual imino-ether hydrochloride together with some unchanged nitrile treated with 150 cc. of alcoholic ammonia in a closed vessel for 1 hour at 60° C. After cooling, the excess alcohol and ammonia are removed under reduced pressure, the residue taken up in water and filtered. On addition of caustic soda solution in slight excess, 4:4' diamidino-diphenyl-oxide is obtained as a white crystalline solid, melting point 215–216° C.

*Example 5*

22.5 grams of 4:4'-dicyanobenzylaniline are suspended in 400 cc. of absolute methyl alcohol and dry hydrochloric acid gas passed in with external cooling until saturated. After standing two days, the solution is filtered and any undissolved material washed with methyl alcohol. On the addition of dry ether to the solution, 4:4'-benzylaniline di-imino ether dihydrochloride separates and is filtered off and washed with methyl alcohol-ether and finally with ether.

The product thus obtained is then suspended in 300 cc. of ethyl alcoholic ammonia (approximately 10% NH₃) and the mixture heated in a pressure bottle at 50° C. until a clear solution is obtained (1–1½ hours). The solution is evaporated in vacuo to dryness. The residue is dissolved in 100 cc. of water, made just acid to Congo Red paper with 2N. hydrochloric acid, shaken with charcoal, filtered and made strongly basic in the presence of ether (50 cc.) using 20% sodium hydroxide solution slowly added with frequent shaking.

4:4'-diamidino-benzylaniline separates out as a white crystalline powder, which after filtering off, washing with water, and drying melts at about 209° C. (decomp).

*Example 6*

10 grams of 4:4'-dicyan-phenyl-benzyl-ether (prepared from 4-cyano-benzyl-chloride and 4-cyano-phenol by the Ullman method) are suspended in 100 cc. of absolute ethyl alcohol and the mixture saturated with dry hydrogen chloride at 0–5° C. The whole is left for 48 hours at 0–10° C. and the excess of hydrogen chloride and alcohol are then removed in a vacuum. The residual mass (containing the imino ether hydrochloride together with a little unchanged nitrile) is then heated in a closed vessel with 15 cc. of 10% ethyl-alcoholic ammonia for 2 hours at 60° C. The excess alcohol and ammonia are removed on a steam bath and the amidine hydrochloride is extracted from the residue with water. The solution is filtered from unchanged nitrile and 4:4' diamidino phenyl benzyl ether precipitated by the addition of caustic soda to the filtrate. It separates as a crystalline solid, melting point 224–5° C. (decomp).

*Example 7*

5 grams of 4:4'-dicyano-dibenzyl are dissolved in 150 cc. of dry chloroform and 5 cc. of absolute ethyl alcohol are added. The solution is then saturated with dry hydrogen chloride and left to stand for 48 hours at room temperature. The imino-ether hydrochloride which separates is filtered off and washed first with a little dry chloroform and then with ether.

The imino-ether hydrochloride so obtained is added to 70 cc. of 10% ethyl-alcoholic ammonia and the whole is heated in a closed vessel for 2 hours at 60° C. The alcohol is then distilled off and the residual hydrochloride is taken up in a little hot water and filtered.

The 4:4' diamidino diphenyl ethane is obtained as a white micro-crystalline product melting point 239–240° C. with decomposition.

*Example 8*

10 grams of 4:4' - dicyano-α-β-diphenoxy-ethane are dissolved in 400 cc. of nitrobenzene and 80 cc. of absolute ethyl alcohol are added. The solution is saturated at 0° C. with dry hydrochloric acid gas and allowed to stand for 18 hours. The solution is diluted with three times its volume of dry ether. The 4:4'-di-imino-ether dihydrochloride of α-β-diphenoxy-ethane separates and is filtered off and washed with ether. 10 grams of this are mixed with 120 cc. of 10% ethyl alcoholic ammonia and heated in a closed vessel at 40° C. for 6 hours. The alcohol is removed, the residue dissolved in water and on the addition of a slight excess of dilute caustic soda, 4:4'-diamidino-α-β-diphenoxy-ethane separates. It is filtered, washed with water, alcohol and ether and when dried, melts at 231–2° C. with decomposition.

*Example 9*

10 grams of 4:4'-dicyano-α-β-diphenoxy propane are dissolved in 400 cc. of nitrobenzene and 10 cc. of ethyl alcohol are added. The solution is saturated at 0° C. with dry hydrochloric acid gas and allowed to stand for 18 hours. The 4:4'-di-imino-ether hydrochloride separates and is filtered and washed with ether. 10 grams of this are heated in a closed vessel with 100 cc. of ethyl alcoholic ammonia (10%) at 40° C. for 6 hours. The alcohol is removed and the residue extracted with 200 cc. of warm water and 20 cc. of concentrated hydrochloric acid. On cooling the dihydrochloride of 4:4'-diamidino-α-β-di-phenoxy propane separates. After recrystallisation from dilute hydrochloric acid, it melts at 287° C. with decomposition.

The corresponding base is obtained by adding dilute caustic soda solution to an aqueous solution of the hydrochloride. It melts at 193–4° C. with decomposition.

*Example 10*

1 gram of 4:4'-dicyano-β-phenoxy-ethyl-aniline is suspended in 30 cc. of absolute ethyl alcohol and saturated with dry hydrochloric acid gas at 0° C. After standing for 18 hours, the solution is treated with 10 times its volume of dry ether whereupon the 4:4'-di-imino-ether hydrochloride of β-phenoxy-ethyl-aniline separates. This is filtered, washed with ether and heated with 10 cc. of ethyl alcoholic ammonia (10%) in a closed vessel at 40° C. for eight hours. The alcohol is removed by distillation, the residue is dissolved in warm water and a slight excess of dilute caustic soda solution added. 4:4'-diamidino-β-phenoxy-ethyl-aniline separates in prisms melting point 204° C. with decomposition.

Example 11

10 grams of 4:4'-dicyano-di-benzyl sulphide (Barkenbus, Friedman, and Flege, J. Amer. Chem. Soc., 1927, 49, 2552) is dissolved in 200 cc. of chloroform 10 cc. ethyl alcohol is added and the solution saturated with hydrogen chloride at 0° C. After keeping at room temperature for 4 days, the hydrochloride is filtered, washed with chloroform, and heated with 300 cc. of saturated alcoholic ammonia to 60° C. for 3 hours. On evaporation of the solvent 4:4'-diamidino-dibenzyl-sulphide dihydrochloride is obtained in the form of colourless blunt needles. The free amidine, melting point 195° C. crystallises in colourless needles, when the aqueous solution of the dihydrochloride is neutralised.

Example 12

10 grams of 4:4'-dicyano-dibenzylamine are suspended in 150 cc of dry methyl alcohol and the mixture saturated at 0° C. with dry hydrochloric acid gas. After standing for about twenty-four hours, the product is filtered off and washed with dry methyl alcohol. The di-imino ether so formed is readily soluble in water and has melting point 313° C. (dec.). 10 grams are suspended in 50 cc. of approximately 10% alcoholic ammonia and the mixture heated for 3 hours at 50° C.

Excess of ammonia and alcohol are removed by evaporation in vacuo, water added and the solution acidified with dilute hydrochloric acid. A small amount of crystalline material which separates is removed by filtration and the filtrate saturated with solid potassium carbonate. The crude semi-solid diamidine which separates is ground with acetone and the dry product obtained on filtration converted to the dihydrochloride by the addition of dry ethereal hydrochloric acid to a solution of the base in methyl alcohol. The product is soluble in water forming a neutral solution and melts at 270° C. (dec.).

Example 13

24.8 grams of 4:4' dicyan-dibenzyl-ether (prepared either by condensation of 4-cyanobenzyl-chloride with 4-cyanobenzyl-alcohol or from di-benzyl-ether 4:4'-dicarboxylic acid by known methods) are dissolved in 50 cc. of dry chloroform and 25 cc. of absolute ethyl alcohol added. The solution is cooled in ice water, and saturated with dry hydrogen chloride. The reaction mixture, contained in a well stoppered vessel, is left for 100 hours in the ice chest, and the solvent and excess hydrogen chloride are then removed at ordinary temperature in a vacuum. The residual mass of dibenzyl ether 4:4'-di-imino ether hydrochloride is heated for 2 hours at 60° C. with a slight excess of dry 10% alcoholic ammonia. The alcohol is then removed and the residual 4:4'-diamino-dibenzyl ether hydrochloride dissolved in water and filtered. The pure base crystallises in glistening plates on addition of excess sodium hydroxide solution to the filtrate, melting point 195° C. (decomp.).

Example 14

2.5 grams of p:p' dicyano-1:5-diphenoxy-pentane (obtained by the interaction of p-hydroxybenzonitrile and pentamethylene-dibromide in aqueous alkaline solution, melting point 114° C.) are dissolved in 15 cc. of nitrobenzene and 2.5 cc. of absolute ethyl alcohol added. The solution is saturated with dry hydrochloric acid gas at 0° C. and allowed to stand for 48 hours. It is then diluted with dry ether and the precipitated p:p' di(ethyl-imino-ether hydrochloride) of 1:5 diphenoxy-pentane is filtered and washed with ether. 4 grams of this compound are mixed with 30 cc. of 6% ethyl alcoholic ammonia and heated in a closed vessel at 50° C. for 5 hours. The alcohol is removed and the residual p:p'-diamidino-1:5-diphenoxy-pentane dihydrochloride is twice recrystallised from dilute hydrochloric acid and finally purified by dissolving in water and precipitating with acetone. It melts at 236° C. with decomposition.

Example 15

Para-hydroxybenzonitrile reacts in alkaline solution with excess of ethylene dibromide to give β (p-cyanophenoxy) ethyl-bromide (melting point 59° C.) which on heating with p-aminobenzonitrile given 4:4' dicyano-β phenoxy-ethyl-aniline melting point 163° C.

4:4 grains of 4:4' dicyano-β phenoxy-ethyl-aniline are dissolved in 100 cc. of nitrobenzene with the addition of 3 cc. of absolute ethyl alcohol. The solution is saturated with dry hydrochloric acid gas at 0° C. and allowed to stand for 48 hours. On dilution with dry ether, the 4:4' di(ethyl-imino - ether - hydrochloride) of β-phenoxy-ethyl-aniline separates and is filtered off and washed with dry ether. 7 grams of the imino-ether are heated with 45 cc. of 7% ethyl-alcoholic ammonia to 50° C. for 5 hours. The alcohol is removed and the residue is recrystallised from dilute hydrochloric acid, dissolved in water and the solution rendered basic with dilute caustic soda solution. 4:4'-diamidino β-phenoxy-ethyl-aniline separates in prisms melting point 204° C. (with decomposition).

Example 16

1 gram of p:p'-dicyano-1:10-diphenoxy-decane, prepared by the interaction of p-hydroxy-benzonitrile and 1:10 dibromdecane in alkaline alcoholic solution, is dissolved in 20 cc. of nitrobenzene and 1 cc. of absolute ethyl alcohol added. The solution is treated with dry hydrochloric acid gas at 0° C. and allowed to stand for 48 hours. It is then diluted with dry ether and the precipitated p:p' di(ethyl-imino-ether-hydrochloride) of 1:10-diphenoxy-decane filtered off. This is mixed with 15 cc. of 10% ethyl alcoholic ammonia and heated in a closed vessel to 60° C. for 4 hours. The solution is then evaporated to dryness, 3 cc. of water added and the mixture acidified to Congo red paper with hydrochloric acid. The crystalline precipitate of p:p'-diamidino-1:10-diphenoxy - decane - dihydrochloride is filtered off, washed with acetone and recrystallised from water; it forms short prisms melting point 254° C.

What we claim and desire to secure by Letters Patent is:

1. Process for the preparation of diamidine derivatives of the type Am.R.X.R.Am in which Am represents the amidine group

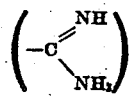

R represents a benzene nucleus, and X represents the linkage O—(CH$_2$)$_n$—O in which $n$ is a whole number of the series from 1 to 10, characterized by treating the corresponding dicyano compounds CN.R.X.R.CN in solution in an anhydrous lower aliphatic alcohol with dry hydrohalide acid being a member of the group consisting of hydrochloric and hydrobromic acid whereby the cyano groups are converted into imino-ether-hydrohalides

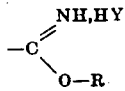

(where Y is a member of the halogen series consisting of chlorine and bromine and R is an alkyl group) and treating the compounds so obtained with ammonia to yield the required diamidines.

2. A diamidine derivative of the type Am.R.X.R.Am in which Am represents the amidine group

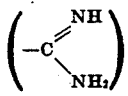

R represents a benzene nucleus, and X represents the linkage O—(CH$_2$)$_n$—O in which $n$ is a whole number of the series from 1 to 10.

3. 4:4' diamidino-α-β-diphenoxy-ethane.
4. 4:4' diamidino-α-γ-diphenoxy-propane.
5. p:p' Diamidino-1:5-diphenoxy-pentane.

6. A member selected from the group consisting of the diamidine derivatives of the type Am.R.X.R.Am, and the hydrochloric and hydrobromic acid addition compounds of such diamidine derivatives, in which Am represents the amidine group

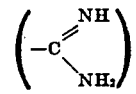

R represents a benzene nucleus, and X represents the linkage O—(CH$_2$)$_n$—O in which $n$ is a whole number of the series from 1 to 10.

ARTHUR JAMES EWINS.
HARRY JAMES BARBER.
GEORGE NEWBERY.
JULIUS NICHOLSON ASHLEY.
ALAN DAVID HENDERSON SELF.